US006126818A

United States Patent [19]
Duerrstein et al.

[11] Patent Number: 6,126,818
[45] Date of Patent: Oct. 3, 2000

[54] FILTER SYSTEM FOR THE LUBRICANT OF AN INTERNAL COMBUSTION ENGINE

[75] Inventors: Rolf Duerrstein, Bietigheim; Goetz Frhr. von Esebeck, Berlin; Robert Ostertag, Tiefenbronn; Rene Reif, Aichwald; Martin Weindorf, Kornwestheim, all of Germany

[73] Assignee: Filterwerk Mann & Hummel GmbH, Ludwigsburg, Germany

[21] Appl. No.: 08/928,666

[22] Filed: Sep. 12, 1997

[30] Foreign Application Priority Data

Sep. 13, 1996 [DE] Germany .......................... 196 37 299

[51] Int. Cl.$^7$ ................................................ B01D 35/147
[52] U.S. Cl. ................... 210/132; 310/136; 310/149; 310/168; 310/181; 310/340; 310/416.5; 310/493.1; 137/118.06; 137/119.09
[58] Field of Search ..................... 210/132, 136, 210/149, 168, 171, 172, 181, 416.5, 340, 341, 424, 130, 493.1; 123/196 A, 196 CP; 137/118.06, 119.08, 119.09

[56] References Cited

U.S. PATENT DOCUMENTS

| | | |
|---|---|---|
| 2,979,160 | 4/1961 | Haas . |
| 3,353,590 | 11/1967 | Holmann . |
| 3,572,507 | 3/1971 | Juskevic .................................. 210/340 |
| 4,033,870 | 7/1977 | Parquet et al. .......................... 210/149 |
| 4,075,099 | 2/1978 | Pelton et al. ............................ 210/172 |
| 4,512,299 | 4/1985 | Egan et al. . |
| 4,615,800 | 10/1986 | Stifelman et al. ....................... 210/340 |
| 5,037,539 | 8/1991 | Hutchins et al. ........................ 210/136 |
| 5,298,158 | 3/1994 | Anderson . |
| 5,339,776 | 8/1994 | Regueiro ............................. 123/196 CP |
| 5,484,536 | 1/1996 | Yamaguchi et al. . |
| 5,499,693 | 3/1996 | Widenhorn . |
| 5,681,454 | 10/1997 | Schenk ................................... 210/132 |

FOREIGN PATENT DOCUMENTS

| | | |
|---|---|---|
| 0675266 A1 | 10/1995 | European Pat. Off. . |
| 2716385 | 2/1994 | France . |
| 550281 | 5/1932 | Germany . |
| 1178829 | 10/1964 | Germany . |
| 2038861 | 2/1972 | Germany . |
| 7731211 | 6/1978 | Germany . |
| 3707208 A1 | 9/1988 | Germany . |
| 3835672 A1 | 4/1990 | Germany . |
| 4230825 A1 | 3/1993 | Germany . |
| 4237028 A1 | 5/1994 | Germany . |
| 4243217 A1 | 6/1994 | Germany . |
| 24639 | 2/1977 | Japan ..................................... 210/172 |
| 104511 | 8/1980 | Japan ..................................... 210/181 |

*Primary Examiner*—Matthew O. Savage
*Attorney, Agent, or Firm*—Evenson, McKeown, Edwards & Lenahan, P.L.L.C.

[57] ABSTRACT

A filter system, in particular for filtering the lubricant of an internal combustion engine, having at least two filter elements (19, 25) which can be connected successively to the oil circuit and a changeover valve (21) which feeds the oil to be cleaned to one of the filter elements, with the valve (21) being operated by the pressure difference between the clean oil side and the raw oil side of a filter element (19, 25, 26).

10 Claims, 3 Drawing Sheets

FILTER SYSTEM FOR THE LUBRICANT OF AN INTERNAL COMBUSTION ENGINE

BACKGROUND OF THE INVENTION

The invention relates to a filter system, especially for the lubricant of an internal combustion engine, having at least two filter elements.

U.S. Pat. No. 5,298,158 discloses a dual filter system in which two filter elements are provided, one filter element being equipped as a full-flow filter and the second filter element as partial flow filter. The partial flow filter element is provided with a valve which reduces the partial flow to a set value. Thus different amounts of the fluid to be filtered flow through the two filters, but basically in a parallel manner. Especially when such filter systems are applied to internal combustion engines, the lubricant produces very great thermal stress resulting in the fact that the filter elements must be replaced after a certain period of time. This requires greater maintenance service in addition to the cost of the replacement elements.

Published German Patent Application No. DE 1,178,829 discloses a changeover system for a dual filter for turning on and off each individual filter element. The changeover at the same time produces a flushing with recycled flushing filtrate and the discharge of the dirt. The disadvantage of such systems is that operating errors can occur which cause unclean filtrate to get into the clean fluid area. Thus, in the state of the art, a changeover apparatus is proposed wherein the changeover apparatus consisting of two rotary cylinders is provided with control slots. This is intended to prevent changeover errors. One disadvantage of the filter system described in the state of the art consists, however, in the fact that the manual changeover also requires more work in maintenance. Moreover, the cost of the components for the prevention of changeover errors is considerable.

SUMMARY OF THE INVENTION

The invention therefore is addressed to the problem of providing a filter system which will have two or more filter elements, and in which the cost of maintenance will be minimized.

In a preferred aspect, the invention is also addressed to providing a filter system especially for the lubricant of an internal combustion engine.

This problem is solved in accordance with the invention by providing a filter system for a lubricating oil circuit, which filter system comprises a series of at least two filter elements which can be successively connected to the oil circuit, and a changeover valve which directs oil in the lubricating oil circuit to one of the filter elements, the changeover valve being operated when a first threshold pressure difference is reached between the dirty oil side and the clean oil side of the one filter element to switch the oil flow in the circuit to a subsequent filter element in the filter series.

The important advantage of the invention is that the filter elements can be connected into the oil circuit successively by a single changeover valve. This changeover valve is one which in an advantageously designed manner makes use of the pressure difference between the clean oil side and the raw oil side of a filter element to perform an automatic changeover whenever the filter element that is in operation has reached its maximum dirt-holding capacity.

The invention has furthermore the advantage that always only one filter element is in operation, thereby limiting the high thermal stresses on the working filter element during operation. Simply by the use of two filter elements in a filter system, the special operation of the filter elements in the oil circuit doubles their useful life. The application of additional filter elements increases the service life according to the number of filter elements. The filter elements consist of a pleated filter paper and are thus economical to produce and can be disposed of economically by burning.

One embodiment of the invention involves the use of a detented piston valve as the changeover valve. At a specified pressure difference the detented piston valve moves one step further and stops in this position until the pressure difference again exceeds a limit. Not until the filter elements have successively reached their filtering capacity is a replacement of all of the filter elements performed and the detented piston valve reset.

An additional advantageous embodiment of the invention makes use of an additional valve which is thermally controlled and below a specific limit temperature in the raw oil flow directs the raw oil flow to an initially unstressed filter element. Since below the limit temperature little or no thermal stress is applied to the filter element, there is no danger that the filled state will be reached prematurely.

The use of the valve has the advantage that in the hot-running state a lower pressure difference will always prevail due to the use of the unstressed filter element and thus a fast and sufficient lubrication of the internal combustion engine is assured.

An additional embodiment of the invention provides for equipping the filter elements with non-return valves or check valves. These prevent the filter elements from running empty and thus they prevent delays in the oil feed when the internal combustion engine is starting.

Furthermore, an oil cooler can be provided, which yields the oil heat to the coolant circuit or to the atmosphere.

It is furthermore advantageous to provide a filtration or cooling system by-pass valve to absorb high pressure shocks which under certain circumstances can do harm to the filter elements.

The filter system can preferably be disposed in the oil pan. It is also possible to flange-mount the filter system on the crankcase or put it in a separate housing in the engine compartment.

The oil pump can be integrated into the filter system. In one advantageous embodiment the pump has an internal control.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be explained in further detail hereinafter with reference to illustrative preferred embodiments shown in the accompanying drawings in which.

DETAILED DESCRIPTION OF THE PREFERRED EMBODIMENTS

Figure 1:
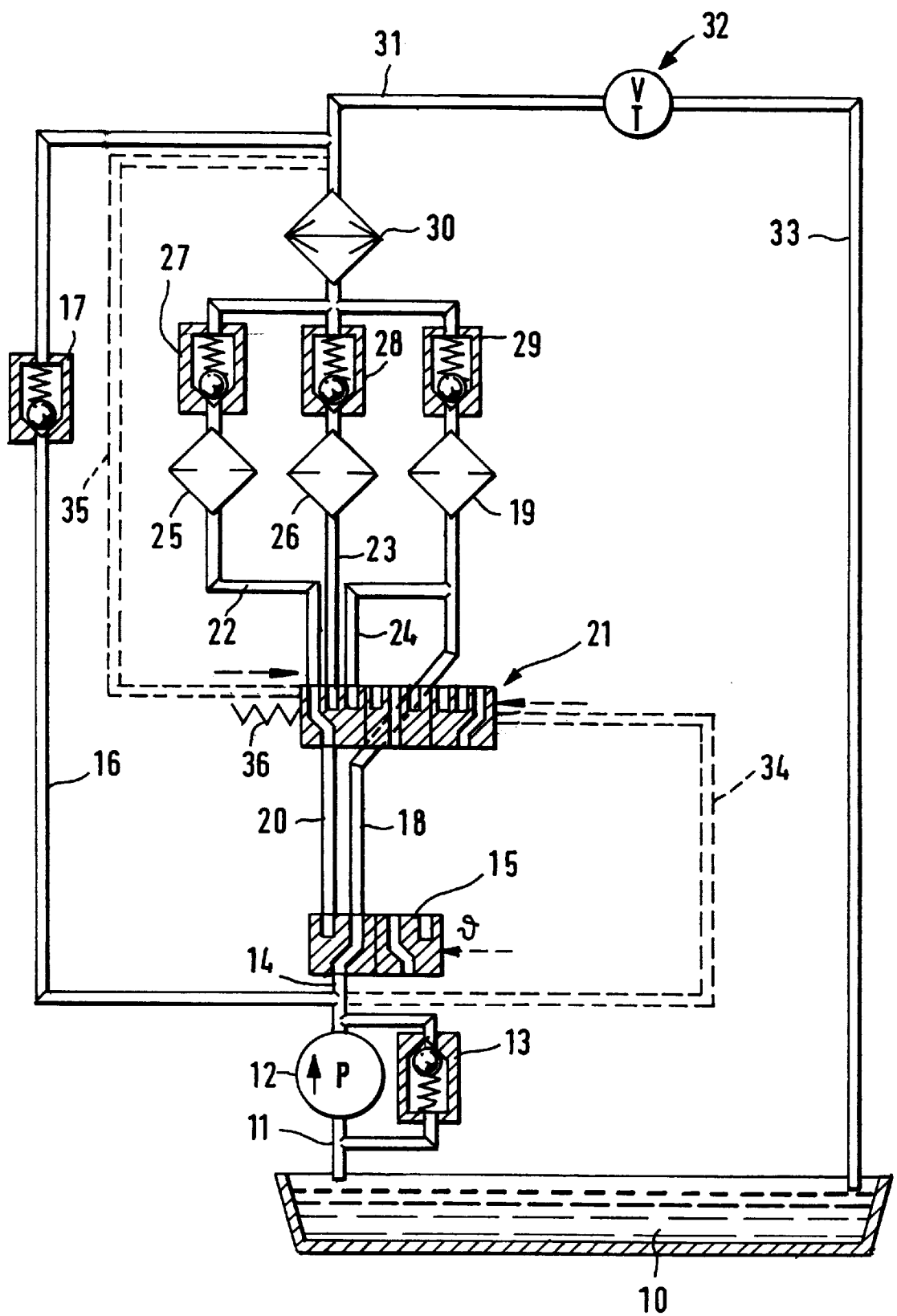
FIG. 1 is a flow diagram of an oil circuit incorporating a filter system according to the invention.

The flow diagram of an oil circuit according to FIG. 1 shows an oil pan 10 from which a line 11 leads to an oil pump 12. The oil pump 12 is provided with an internal bypass valve 13. A line 14 runs from the oil pump to a thermal valve 15, and also a bypass line 16 with a bypass valve 17. Below a temperature limit of, for example 80° C., the thermal valve 15 switches the oil stream delivered by the oil pump 12 to line 18 to the filter system 19. Above the temperature limit the thermal valve 15 changes over, so that line 14 is connected to line 20. Line 20 leads to a three-way valve 21, which may be as a detented piston valve. This three-way valve has three outputs which lead to lines 22, 23 and 24. Line 22 is connected to filter system 25, line 23 to filter system 26, and line 24 to filter system 19. Each of these filter systems comprises a paper filter element, for example a pleated filter paper, which is disposed in an appropriate housing. The clean fluid output of each filter system is connected each to a non-return valve 27, 28, 29. The outputs from the non-return valves run together into an oil cooler 30, through which the coolant of the coolant circuit flows, for example, reducing its temperature. The filtered and cooled oil leaves the oil cooler 30 through line 31 and reaches the various engine lubrication points 32, and it flows from there through line 33 back into the oil pan.

The three-way detented piston valve 21 is operated by the pressure difference between the raw or unfiltered oil side and the clean or filtered oil side. For this purpose a line 34 is provided on the raw oil side and a line 35 on the clean oil side. As soon as the pressure difference reaches a certain threshold level, the raw oil pressure forces the three-way detented piston valve to the left against the force of spring 36 to the position of the next detent.

In the position shown in FIG. 1 the oil or lubricant from line 20 flows through the filter system 25. As soon as the three-way detented piston valve has shifted to the next position the oil flows through filter system 26. This takes place when the dirt capacity of filter element 25 is reached. This full state manifests itself in a high resistance to the flow and a consequent large pressure drop across the filter.

When the filter system 26 is entirely clogged, the three-way detented piston valve advances another step and directs the raw fluid to filter system 19. Not until this latter filter 19 has reached its capacity is it necessary to replace the filters and reset the three-way valve.

The individual filter cartridges are designed such that, after the allowed time of use their capacity for holding dirt is reached and the next filter is switched in by the pressure difference. Thus, by providing a plurality of filters which are automatically replaced when their dirt collecting capacity is reached, the cost of filter maintenance is substantially reduced.

Figure 2:
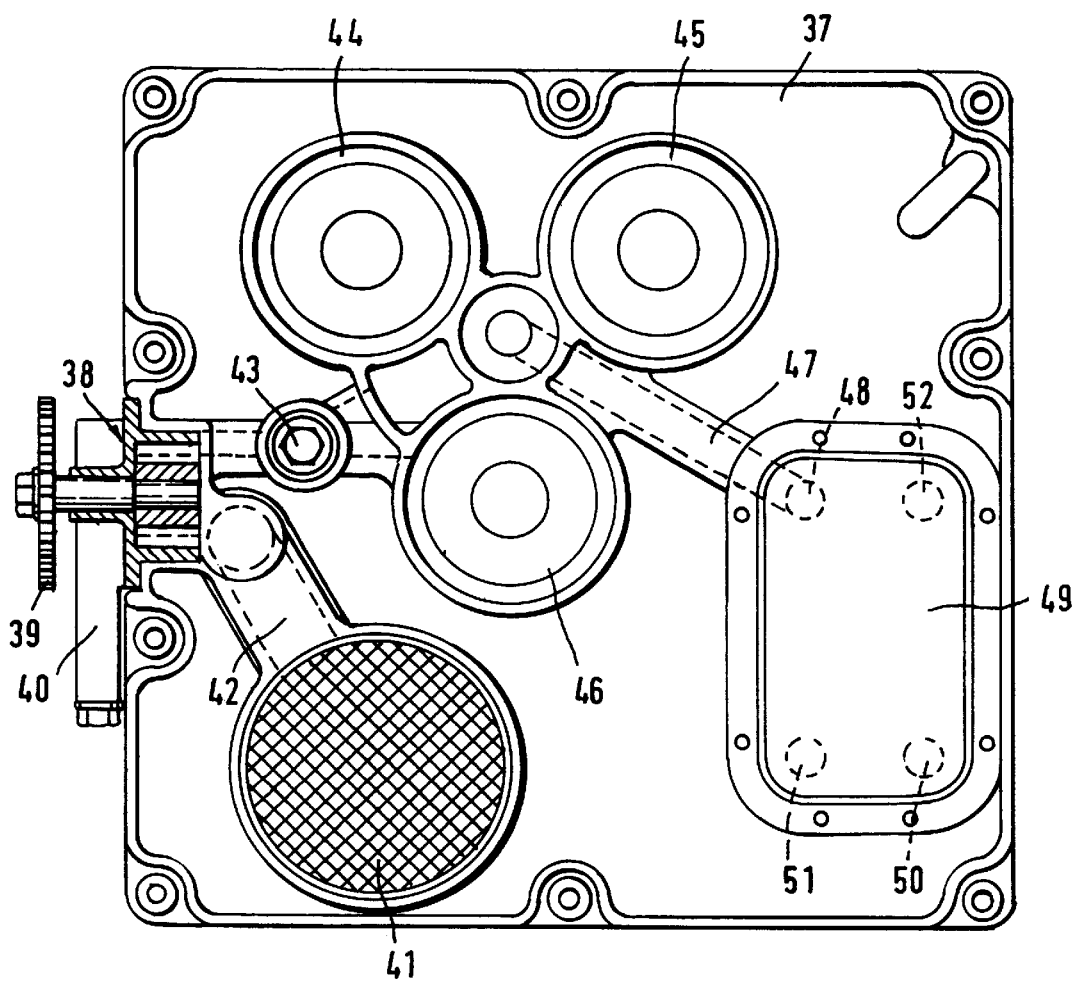
FIG. 2 is a schematic illustration of a filter system arrangement according to the invention on a support.

FIG. 2 is a schematic representation of an embodiment and a possible integration of such a long-life oil filter into a dry sump module, a tank in which the oil reservoir, the suction and pumping by the oil pump and the cooling and filtration of the oil are integrated. An external gear pump 38 is mounted on a base plate 37. The pump is driven via the pinion 39. Also on the external gear pump is a non-return valve 40. The oil to be cleaned is drawn through a suction screen 41 and passes through the channel 42 to the external gear pump 38. From there the pumped oil passes through a thermal valve 43 and a three-way detented piston valve not shown here, to one of the filter systems 44, 45, 46. The cleaned oil passes through a clean oil channel 47 to the entrance 48 of an oil-water heat exchanger 49, and leaves the latter through the connection 50. The oil-water heat exchanger is provided with a cooling liquid inlet 51 and a cooling liquid outlet 52.

The filter system can be disposed, for example, in the oil pan, or mounted laterally on the crankcase by means of flanges, or arranged as a separate container in the engine compartment, for example, of a motor vehicle.

Figure 3A:
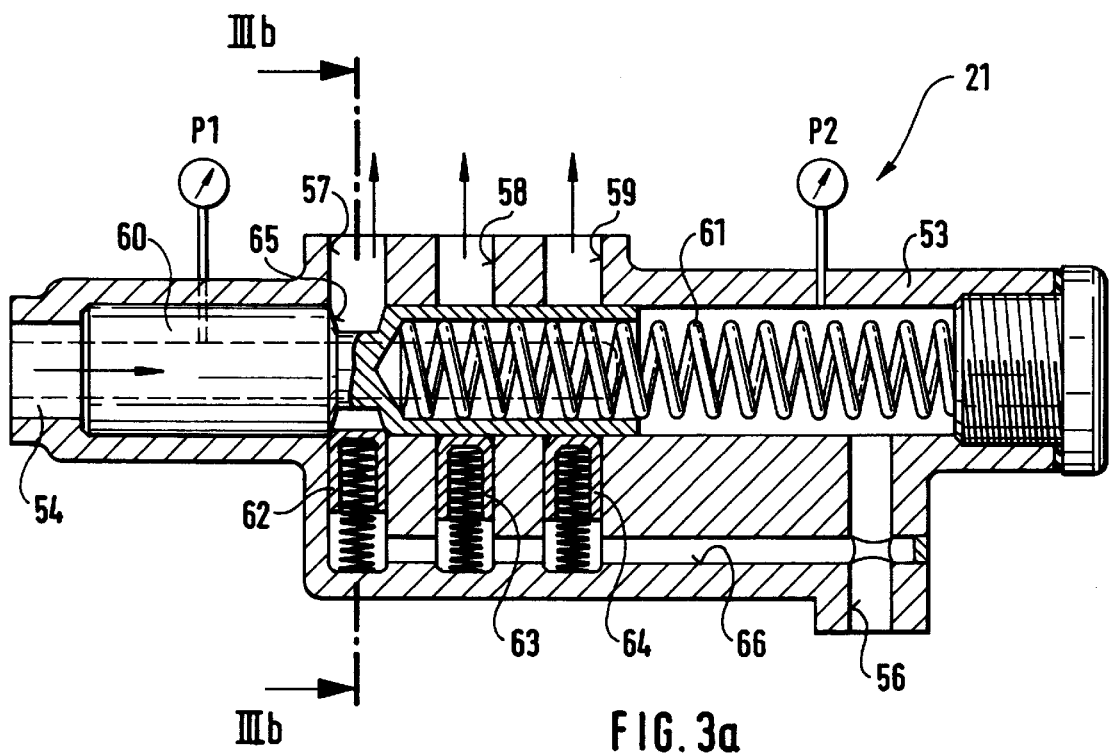
FIGS. 3a are 3b are detail views of a detented piston valve useful in conjunction with the filter system of the invention.
Figure 3B:
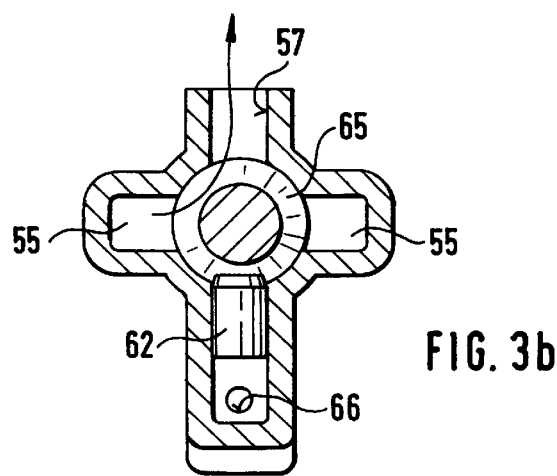

FIG. 3 is a partial view of a detented piston valve 21. The valve comprises a housing 53 which has a first connection 54 for the line 34 shown in FIG. 1, and a second connection 56 for the line 35 shown in FIG. 1. Through the connection 54 the raw oil pressure is applied by the thermal valve, and through connection 56 the clean oil pressure is applied.

The connections 57, 58 and 59 are connected to the filter systems 25, 26 and 19 shown in FIG. 1.

A control piston 60 is disposed in the housing 53. This piston is biased by the compression spring 61 to the left end position. Furthermore, three detented pistons 62, 63, 64 are provided for the control piston 60. When the control piston 60 is in the position shown, the detented piston 62 is engaged in a recess 65 of the control piston 60.

The clean oil pressure delivered through connection 56 passes through the line 66 into the rear area of the detent piston 62 and causes the detent piston to enter the recess 65 of the control piston 60. The oil fed through the connection 54 passes through the recess 55 into the annular opening 65 and from there it passes on to the connection 57 and to the filter system 25 shown in FIG. 1.

If the pressure difference between the raw oil side and the clean oil side increases due to the degree to which the filter system 25 is loaded with dirt, the raw oil pressure p1 produces a displacement of the detent piston 62 to the right against the spring force and the pressure p2 on the clean oil side. This takes place until the detent piston 63 snaps into the recess 65 in the control piston 60 and then the raw oil is fed to the filter system 26 according to FIG. 1.

If this filter system is used up and the pressure in the clean oil side decreases relative to the raw oil side, then the pressure on the raw oil side produces another displacement of the control piston to the right, until it is caught by the detent piston 64 and the raw oil then can pass to the filter system 19.

If filter system 19 is also used up, the filter systems must be replaced and the control piston reset.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A filter system for a lubricating oil circuit, said filter system comprising a series of at least two filter elements which can be successively connected to the oil circuit, and a three-way detented differential pressure operated piston changeover valve for directing oil in the lubricating oil circuit to one of the filter elements, said changeover valve comprising a housing having an inlet for raw oil and a series of at least two outlets each respectively connected to a raw oil side of a respective filter element of said series of filter elements and a control piston axially movably positioned within a connecting bore disposed in the housing between said inlet and said series of at least two outlets, a spring biasing said control piston toward an initial position, one end of said piston being in communication with the raw oil side of the one filter element such that said piston is urged in response to pressure of the raw oil away from said initial position and the opposite end of said piston being in communication with a clean oil side of the one filter element such that said piston is urged in response to Pressure of the clean oil toward said initial position, and wherein three detent pistons are arranged to control the position of the control piston within the housing, said control piston of said changeover valve being moved to a next successive position when a first threshold pressure difference is reached between the raw oil side and the clean oil side of the one filter element to switch the oil flow through one of said outlets in the changeover valve to a next successive one of the outlets in the changeover valve for directing raw oil to one of the other filter elements in the filter series.

2. A filter system according to claim 1, wherein said filter system is positioned in an internal combustion engine such that said lubricating oil circuit provides oil flow in said internal combustion engine.

3. A filter system according to claim 1, wherein each of said filter elements comprises an oil filter cartridge containing a pleated filter paper.

4. A filter system according to claim 1, further comprising an additional valve disposed in a line leading to the raw oil inlet of said changeover valve, said additional valve below a second threshold temperature directing a flow of unfiltered oil to a last filter element in said series of filter elements.

5. A filter system according to claim 1, wherein each filter element is connected to the oil circuit through a check valve to ensure oil flows in a single direction through the filter element.

6. A filter system according to claim 1, further comprising an oil cooler connected to outlet lines from the clean oil side of said filter elements, said oil cooler transferring heat from filtered oil to a cooling water circuit or to ambient air.

7. A filter system according to claim 6, further comprising a bypass line and bypass valve connected between a line leading to the raw oil inlet of said changeover valve and a cooled oil outlet line from said oil cooler.

8. A filter system according to claim 1, further comprising a filter bypass valve including a bypass line disposed in said oil circuit for bvyassing said changeover valve and said at least two filter elements.

9. A filter system according to claim 1, wherein said lubricating oil circuit further comprises an oil pump connected to a line leading to the raw oil inlet of said changeover valve to supply raw oil to said changeover valve.

10. A filter system according to claim 9, wherein said oil pump includes an internal bypass valve comprising a pressure relief valve connected between an outlet of said oil pump and an inlet of said oil pump for relieving excessive pressure at said oil pump outlet.

* * * * *